(12) United States Patent
Wang et al.

(10) Patent No.: US 9,062,804 B2
(45) Date of Patent: Jun. 23, 2015

(54) THREADED CONNECTOR

(75) Inventors: Jing Wang, Tianjin (CN); Zhiqian Xu, Tianjin (CN); Xiaoqing Lu, Tianjin (CN); Chunzhong Wang, Tianjin (CN); Jun Zhang, Tianjin (CN); Long Yan, Tianjin (CN); Tao Chen, Tianjin (CN); Li Mei, Tianjin (CN); Bin Shi, Tianjin (CN)

(73) Assignee: Tianjin Pipe (Group) Corporation, Tianjin (CN)

( * ) Notice: Subject to any disclaimer, the term of this patent is extended or adjusted under 35 U.S.C. 154(b) by 498 days.

(21) Appl. No.: 13/241,170

(22) Filed: Sep. 22, 2011

(65) Prior Publication Data

US 2012/0013122 A1    Jan. 19, 2012

Related U.S. Application Data

(63) Continuation-in-part of application No. PCT/CN2009/075166, filed on Dec. 21, 2009.

(30) Foreign Application Priority Data

Nov. 4, 2009  (CN) .......................... 2009 1 0071149

(51) Int. Cl.
*F16L 15/06* (2006.01)

(52) U.S. Cl.
CPC ..................................... *F16L 15/06* (2013.01)

(58) Field of Classification Search
CPC .......... F16L 15/004; F16L 15/06; F16L 15/04

USPC .......................... 285/333–334, 355, 383, 390
See application file for complete search history.

(56) References Cited

U.S. PATENT DOCUMENTS

| | | | | |
|---|---|---|---|---|
| 2,177,100 A * | 10/1939 | Frame | ........................... | 285/334 |
| 3,572,777 A * | 3/1971 | Blose et al. | ................... | 285/334 |
| 4,384,737 A * | 5/1983 | Reusser | ........................ | 285/334 |
| 4,629,222 A * | 12/1986 | Dearden et al. | ............ | 285/332.4 |
| 5,462,315 A * | 10/1995 | Klementich | ................... | 285/334 |
| 6,767,035 B2 * | 7/2004 | Hashem | ........................ | 285/333 |
| 6,893,057 B2 * | 5/2005 | Evans | ........................... | 285/334 |
| 7,347,459 B2 * | 3/2008 | Geary et al. | ................... | 285/390 |
| 7,510,219 B2 * | 3/2009 | Huston | ......................... | 285/333 |
| 7,810,849 B2 * | 10/2010 | Reynolds, Jr. | ................ | 285/334 |
| 2003/0025327 A1 * | 2/2003 | Mannella | ...................... | 285/334 |
| 2005/0242583 A1 * | 11/2005 | Geary et al. | ................... | 285/333 |
| 2008/0179884 A1 * | 7/2008 | Geary et al. | ................... | 285/390 |
| 2010/0078936 A1 * | 4/2010 | Nakamura et al. | ............ | 285/334 |

* cited by examiner

*Primary Examiner* — David E Bochna
(74) *Attorney, Agent, or Firm* — Matthias Scholl P.C.; Scholl Matthias

(57) ABSTRACT

A threaded connector including female thread and male thread. The female thread is symmetrically disposed on both ends of a coupling. The male thread is disposed at an end of a pipe. The female thread includes buttress thread. A torque shoulder is disposed in front of the buttress thread. The female thread is connected to the torque shoulder via a tool withdrawal groove. A protruding threaded segment is disposed on any one of a fourth to seventh tooth of the female thread to prevent high pressure gas from leaking.

6 Claims, 5 Drawing Sheets

US 9,062,804 B2

THREADED CONNECTOR

CROSS-REFERENCE TO RELATED APPLICATIONS

This application is a continuation-in-part of International Patent Application No. PCT/CN2009/075166 with an international filing date of Dec. 21, 2009, designating the United States, now pending, and further claims priority benefits to Chinese Patent Application No. 200910071149.8 filed on Nov. 4, 2009. The contents of all of the aforementioned applications, including any intervening amendments thereto, are incorporated herein by reference.

BACKGROUND OF THE INVENTION

1. Field of the Invention

The invention relates to a threaded connector, and more particularly to a gas-sealing threaded connector.

2. Description of the Related Art

Nowadays, threaded connectors are widely used in exploiting underground natural gas, and high gas-sealing performance thereof must be ensured.

FIG. 1 illustrates a conventional threaded connector, in which a conical or spherical sealing surface is formed on a small end of external thread of a pipe, and another conical or spherical sealing surface is formed on a small end of internal thread of a coupling fit therewith. As the external thread is tightly fit with the internal thread, appropriate interference is generated between the sealing surfaces thereby facilitating sealing of gas.

Normally, threads of a tubing and casing operate for connection. After the external thread is tightly fit with the internal thread, a gap exists in a part of a thread tooth, and thus one or two spiral leakage channels A and B are formed, which leads to leakage of high pressure gas, as shown in FIGS. 2 and 3.

SUMMARY OF THE INVENTION

In view of the above-described problem, it is an objective of the invention to provide a threaded connector capable of addressing the above-mentioned problems.

To achieve the above objective, in accordance with one embodiment of the invention, provided is a threaded connector comprising female thread and male thread, wherein the female thread is symmetrically disposed on both ends of a coupling, the male thread is disposed at an end of a pipe, the female thread comprises buttress thread, a torque shoulder is disposed in front of the buttress thread, the female thread is connected to the torque shoulder via a tool withdrawal groove, and a protruding threaded segment is disposed on any one of a fourth to seventh teeth of the female thread to prevent high pressure gas from leaking.

In a class of this embodiment, the female thread comprises connecting thread and protruding thread, the buttress thread has high connection strength, a taper of the protruding threaded segment is 1:16, a pitch of the protruding threaded segment is four teeth per inch, a tooth height of the protruding threaded segment is 1.78-2.03 mm, an angle of a stabbing flank is $\beta=15-45°$, and an angle of a load flank is $\alpha=0-4°$.

Advantages of the invention are summarized below: by blocking the leakage channel at the bottom and the top of the tooth after the male thread is tightly fit with the female thread, gas-sealing is facilitated, which improves connection efficiency of the thread; moreover, height of the thread is greater than that of an American Petroleum Association (API) with the same size, which improves connection strength of the thread; finally, after the connecting thread of the threaded connector is engaged, no gap exists between the teeth, which makes the connector bear comparatively large compression loads, and thus improving compression strength of the connector.

Figure 1:
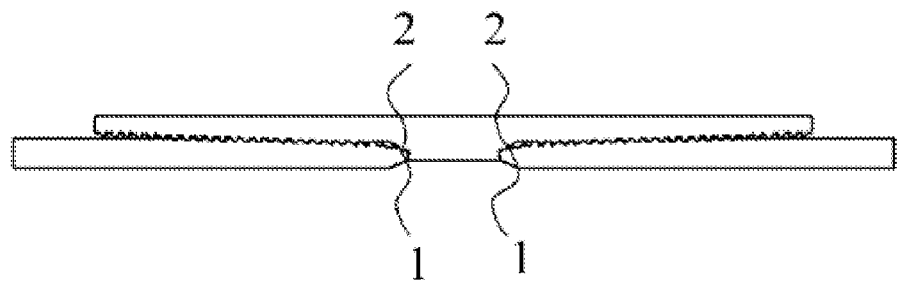
FIG. 1 illustrates a conventional threaded connector with sealing surface.
Figure 2:
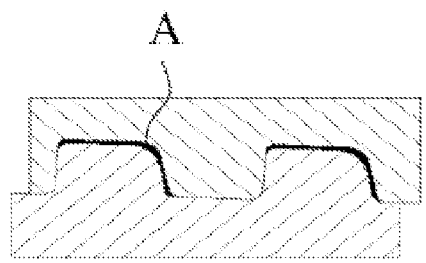
FIG. 2 is an axial-sectional view of teeth of buttress thread of API with one leakage channel A.
Figure 3:
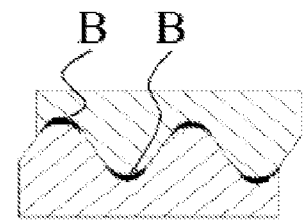
FIG. 3 is an axial-sectional view of teeth of round thread of API with two leakage channel B.
Figure 4:
FIG. 4 is a threaded connector of an exemplary embodiment of the invention.

In the drawings, the following reference numbers are used: 1—sealing surface on a male end; 2—sealing surface on a female end; 3—protruding thread on a female end; A—spiral leakage channel of buttress thread; B—two spiral leakage channels of round thread; C—thread tooth on a male end; L—tooth root of protruding thread is lower than adjacent thread; M—tooth top of protruding thread is lower than adjacent thread; D—protruding thread blocks spiral leakage channels; k—axial machine-tight value of threaded connector; a—angle of load flank of buttress thread; 3—angle of stabbing flank of buttress thread; h—height of buttress thread; N—protruding thread blocking spiral leakage channel; P—spiral leakage channel.

DETAILED DESCRIPTION OF THE EMBODIMENTS

Description of the invention will be given below in conjunction with accompanying drawings.

A threaded connector of the invention comprises female thread and male thread. The female thread is symmetrically disposed on both ends of a coupling, the male thread is disposed at an end of a pipe, the female thread comprises buttress thread, a torque shoulder is disposed in front of the buttress thread, the female thread is connected to the torque shoulder via a tool withdrawal groove, and a protruding threaded segment is disposed on any one of a fourth to seventh tooth of the female thread to prevent high pressure gas from leaking.

The female thread comprises connecting thread, and protruding thread, the buttress thread has high connection strength, a tooth height of the protruding threaded segment is 1.78-2.03 mm, an angle of a stabbing flank is $\beta=15-45°$, and an angle of a load flank is $\alpha=0-4°$.

The female thread of the coupling is connected to the torque shoulder via the tool withdrawal groove, the torque shoulder ensures accurate positioning of the male thread and the female thread during tight fit therebetween. No sealing surface disposed on an end of the male thread, and thickness of the pipe end more than 1 mm greater than that achieved by conventional gas-sealing methods, which provides larger stiffness, and ensures the end of the male thread is not easily deformed as twisting moment is too large.

Figure 6:
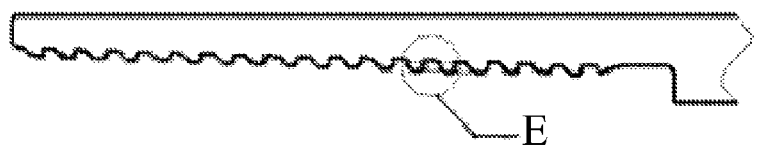
FIG. 6 illustrates a female of a threaded connector.
Figure 7:
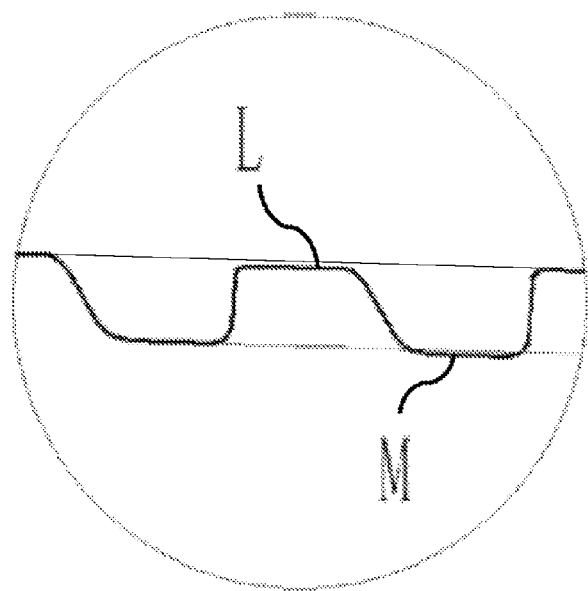
FIG. 7 illustrates an enlarged view of the section labeled E in FIG. 6.
Figure 8:
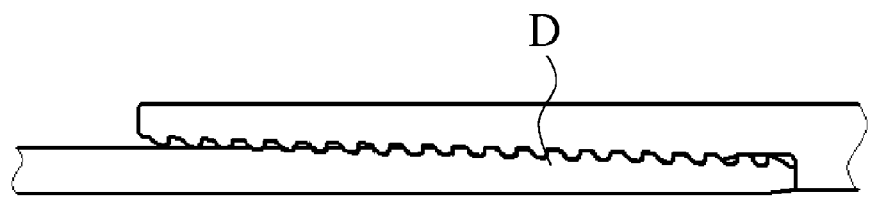
FIG. 8 illustrates a make-up position of a threaded connector.

As shown in FIGS. 6 and 7, the connecting thread of the female thread of the threaded connector operates for connection. After being fit with the male thread, no gap exists between the male thread and the female thread, and a gap exists between a tooth root and a tooth top, whereby forming two spiral leakage channels. Middle diameter of the protruding thread of the female thread is comparatively small, as the female thread is tightly fit with the male thread, comparatively large radial interference is generated therebetween, which eliminates the gap between the tooth root and the tooth top, and blocks the leakage channel, whereby facilitating sealing of high pressure gas. The sealing structure is in the shape of a concave-convex tooth, and a total length thereof is far greater than that of a conventional structure employing sealing surface structure at the small end of the male thread and the female thread, and features better sealing performance.

Normally, the greater a pitch of thread is, the difficult cross threading occurs. A pitch of an API round thread is 10 teeth per inch, and 8 teeth per inch. A pitch of an API buttress thread is 5 teeth per inch. As a diameter of a pipe is large, cross threading easily occurs as the male thread or the female thread slightly inclines. The threaded connector of the invention uses four teeth per inch, and prevents cross threading.

An angle of the stabbing flank of the threaded connector thread determines threading performance of the connector. The larger the angle, the easier threading. The angle $\beta$ is 15–45°, which reduces possibility of cross threading of the connector. An angle of the load flank of the thread $\alpha$ is 0–4°, as tension loads are acted on the casing, radial component force generated by axial loads is small, which improves connection efficiency of the thread. Moreover, height of the thread is greater than that of an API thread with the same size, which improves connection strength of the thread.

Figure 5:
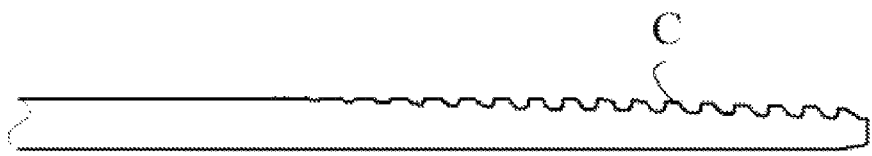
FIG. 5 illustrates a male of a threaded connector.

After the male thread and the female thread of the tubing and the casing of the threaded connector are fit with each other, there is no gap on teeth thereof, which makes the connector capable of bearing large compression loads, and improves compression strength of the connector. As shown in FIGS. 6 and 7, protruding thread different from other thread is designed on a position of the internal thread of the coupling. During production, protruding thread meeting design requirements are made by changing cutting trace on a numerical control lathe, and the external thread is made via conventional methods, as shown in FIG. 5.

The threaded connector can be applied to a pipe with a diameter between 60.32 to 273.05 mm.

Basic parameters of the thread of the threaded connector: thread taper 1:16, pitch 6.35 mm.

Figure 9:
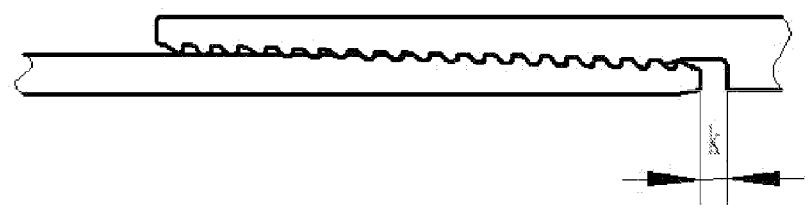
FIG. 9 illustrates a hand-tight position of a threaded connector.
Figure 10:
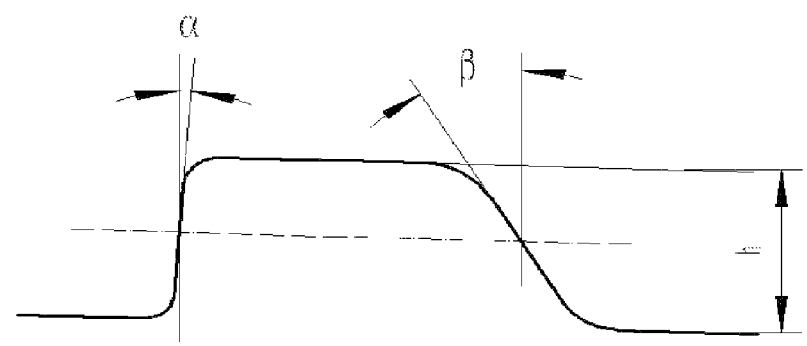
FIG. 10 illustrates teeth form of a tubing and casing of the invention.

As shown in FIG. 9, an appropriate axial machine-tight value k of the threaded connector is a sufficient condition for facilitating above-mentioned functions. As shown in FIG. 10, appropriate angles $\alpha$ and $\beta$, and height h are necessary conditions for facilitating above-mentioned functions.

Figure 11:
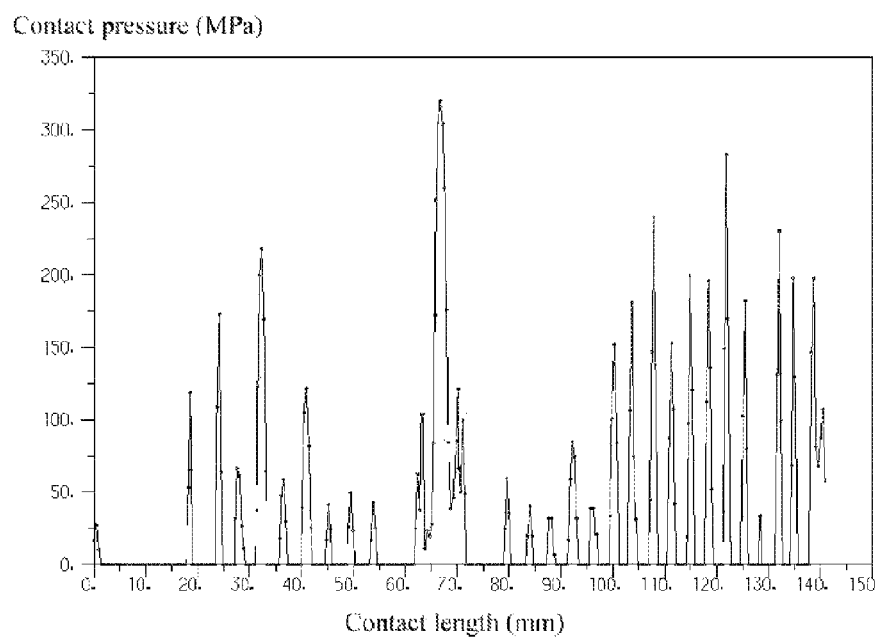
FIG. 11 illustrates distribution of contact stress of thread of the invention obtained via a finite element analysis (FEA)
Figure 12:
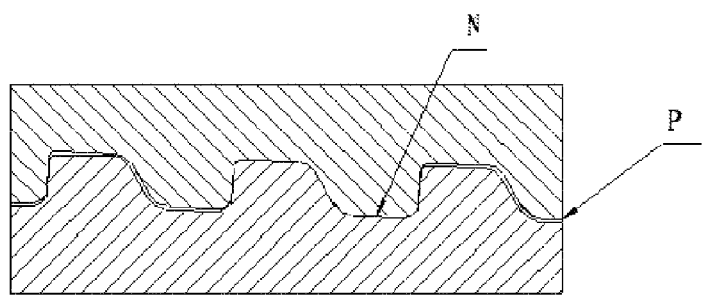
FIG. 12 illustrates blockage of leakage channels via protruding thread.

As shown in FIG. 11, using a finite element analysis (FEA) to analyze the above structure, a vertical coordinate indicates contact stress of each tooth after the make-up, a horizontal coordinate indicates a length of contact, the contact stress of the thread fit with each other is the same as a predicted intent, and the contact stress of the thread at the protruding thread is greater than zero. As shown in FIG. 12, as gas passes the leakage channel and reaches the protruding thread, it is blocked by the protruding thread.

Figure 13:
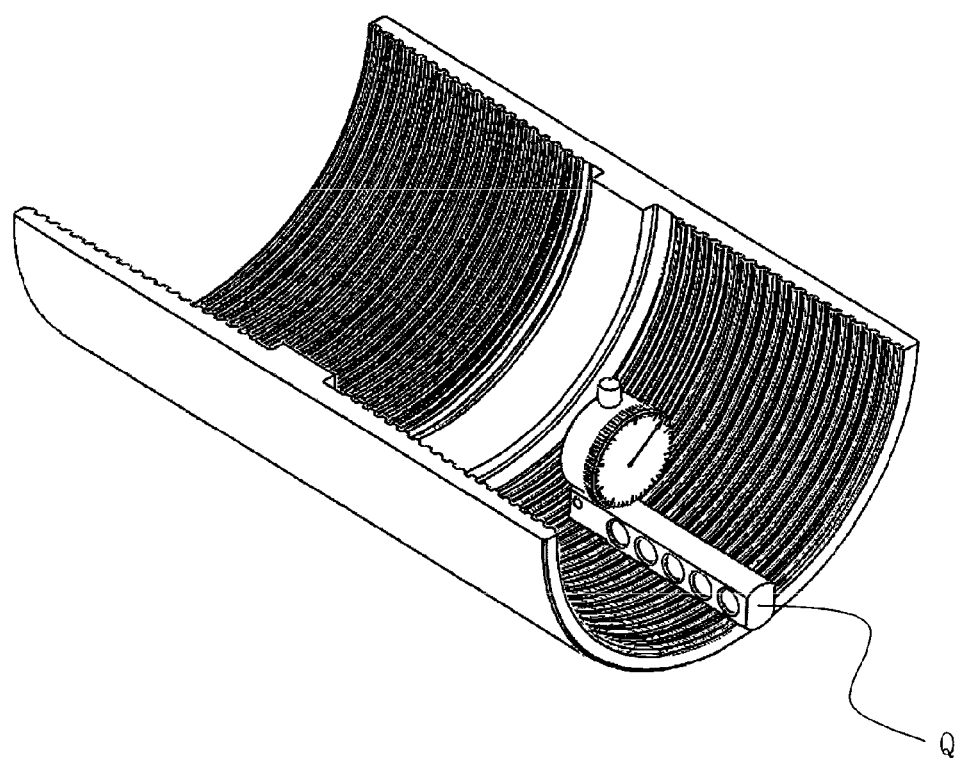
FIG. 13 illustrates inspection of special thread of a coupling via a special measurement gauge.

As shown in FIG. 13, a special measurement gauge Q is used to inspect the protruding thread.

The threaded connector of the invention has passed several tests with different size in different labs.

For the threaded connector of the gas-sealing threaded connector, production of the male thread of the pipe is similar to normal API buttress thread. During production of the female thread of the coupling, part of the protruding thread is made, and the tool withdrawal groove and the torque shoulder are made at the small end of the coupling thread.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A threaded pipe connection, comprising:
   a coupling having a torque shoulder and two female threads; and
   a pipe having a male thread;
wherein:
   said two female threads are symmetrically disposed on both ends of the coupling;
   said torque shoulder is disposed on the coupling and between said two female threads;
   said male thread is disposed at an end of the pipe;
   each said female thread comprises a buttress thread;
   said buttress thread comprises a plurality of teeth;
   one of a fourth to seventh tooth of said plurality of teeth as counted from said torque shoulder is a protruding threaded segment;
   said plurality of teeth comprises said protruding threaded segment and a remaining plurality of teeth;
   each of said remaining plurality of teeth comprises a first load flank, a first tooth crest, a first stabbing flank, and a first tooth root;
   said protruding threaded segment comprises a second load flank, a second tooth crest, a second stabbing flank, and a second tooth root;
   said first tooth roots are disposed along a tooth root baseline;
   said first tooth crests are disposed along a tooth crest baseline;
   said second tooth root protrudes from said tooth root baseline and toward said tooth crest baseline;
   said second tooth crest protrudes from said tooth crest baseline and away from said tooth root baseline; and
   one of said two female threads engages said male thread, and said protruding threaded segment forms an interference fit with said male thread along said second load flank, said second tooth crest, said second stabbing flank, and said second tooth root; whereby forming a seal along said second load flank, said second tooth crest, said second stabbing flank, and said second tooth root to prevent high pressure gas from leaking.

2. The threaded pipe connection of claim 1, wherein:
   a taper of said protruding threaded segment is 1:16;
   a pitch of said protruding threaded segment is four teeth per inch;
   a tooth height of said protruding threaded segment is 1.78-2.03 mm;

said second stabbing flank forms an angle β with a line perpendicular to said second tooth root, and β is between 15 and 45°; and said second load flank forms an angle α with a line perpendicular to said second tooth root, and α is between 0 and 4°.

3. A threaded pipe connection, comprising:

a pipe having a threaded end and a male thread disposed on said threaded end; and a coupling comprising two end portions, a central portion, two female threads symmetrically disposed on said two end portions, and a torque shoulder disposed on said central portion;

wherein:

each of said two female threads is a buttress thread;

said buttress thread comprises a plurality of teeth and a protruding threaded segment;

each of said plurality of teeth comprises a first load flank, a first tooth crest, a first stabbing flank, and a first tooth root;

said protruding threaded segment comprises a second load flank, a second tooth crest, a second stabbing flank, and a second tooth root;

said threaded end is connected to one of said two end portions and one of said two female threads engages said male thread; whereby said pipe is fitted in said coupling;

said first tooth roots are disposed along a tooth root baseline;

said first tooth crests are disposed along a tooth crest baseline;

said second tooth root protrudes from said tooth root baseline and toward said tooth crest baseline;

said second tooth crest protrudes from said tooth crest baseline and away from said tooth root baseline; and said second load flank, said second tooth crest, said second stabbing flank, and said second tooth root form an interference fit with said male thread whereby forming a gas-seal along said second load flank, said second tooth crest, said second stabbing flank, and said second tooth root to prevent high pressure gas from leaking.

4. The threaded pipe connection of claim 3, wherein:

said protruding threaded segment has a taper of 1:16;

said protruding threaded segment has a pitch of four teeth per inch;

said protruding threaded segment has a tooth height of between 1.78 and 2.03 mm;

said second stabbing flank forms an angle β with a line perpendicular to said second tooth root, and β is between 15 and 45°; and said second load flank forms an angle α with a line perpendicular to said second tooth root, and α is between 0 and 4°.

5. A threaded pipe connection, comprising:

a pipe having a threaded end and a male thread disposed on said threaded end; and a coupling comprising a central portion, two end portions, two female threads symmetrically disposed on said two end portions, and a torque shoulder disposed on said central portion;

wherein:

each of said two female threads is a buttress thread;

said buttress thread comprises a plurality of teeth and a protruding threaded segment;

each of said plurality of teeth comprises a first load flank, a first tooth crest, a first stabbing flank, and a first tooth root;

said protruding threaded segment comprises a second load flank, a second tooth crest, a second stabbing flank, and a second tooth root;

said first tooth crests are disposed along a tooth crest baseline;

said first tooth roots are disposed along a tooth root baseline;

said threaded end is connected to one of said two end portions and one of said two female threads engages said male thread; whereby said pipe is fitted in said coupling;

said second tooth root protrudes from said tooth root baseline and toward said tooth crest baseline;

said second tooth crest protrudes from said tooth crest baseline and away from said tooth root baseline;

gaps are formed between said first tooth crests and said male thread and between said first tooth roots and said male thread;

said gaps form two spiral leakage channels on two sides of said protruding threaded segment; and said second load flank, said second tooth crest, said second stabbing flank, and said second tooth root form an interference fit with said male thread whereby forming a gas seal along said second load flank, said second tooth crest, said second stabbing flank, and said second tooth root to segregate said two spiral leakage channels.

6. The threaded pipe connection of claim 5, wherein:

said protruding threaded segment has a taper of 1:16;

said protruding threaded segment has a pitch of four teeth per inch;

said protruding threaded segment has a tooth height of between 1.78 and 2.03 mm;

said second stabbing flank forms an angle β with a line perpendicular to said second tooth root, and β is between 15 and 45°; and said second load flank forms an angle α with a line perpendicular to said second tooth root, and α is between 0 and 4°.

* * * * *